Patented July 6, 1937

2,085,748

UNITED STATES PATENT OFFICE 2,085,748

ALIPHATIC ADDITION AGENTS

John A. Henricks, Jr., Chicago, Ill., assignor, by mesne assignments, to E. I. du Pont de Nemours & Company, Wilmington, Del., a corporation of Delaware No Drawing. Application July 30, 1934,
Serial No. 737,611

10 Claims. (Cl. 204—1)

This invention relates to cadmium plating, and is particularly directed to certain novel addition agents, to baths containing them, and to plating processes employing them.

My novel addition agents are aliphatic compounds of at least two carbon atoms which contain a carbonyl, C=O, group and reaction products of such aliphatic compounds in alkali metal cyanide solution. In use, my novel addition agents are preferably added to cyanide-cadmium plating baths wherein they have a marked effect upon the nature of the cadmium deposit.

It is believed that in a cyanide bath the aldehydes and ketones undergo some change. The change, in some cases, may be simply a conversion to the enol form, but the experimental evidence available indicates that, at least in certain cases, there is a reaction between the aldehyde or ketone and the cyanide. It may be that in other cases the aldehyde or ketone condenses in the presence of the cyanide, but without a definite reaction therewith. The experimental difficulties involved in determining exactly what takes place are very great, as most of the products resulting from treatment with cyanide are somewhat unstable, and are very complex. I shall, accordingly, designate the change, of whatever nature, a reaction, and I shall term the changed products alkali metal cyanide reaction products.

In general, I find it satisfactory to simply add the aldehyde or ketone to the cyanide bath. From a commercial standpoint, however, it is preferable to first treat the aldehyde or ketone with relatively strong alkali metal cyanide solution. In almost every case this latter method leads to somewhat better results, the change presumably being effected more completely and more quickly than if the aldehyde or ketone were simply added to a cyanide bath. The pretreated aldehydes or ketones may frequently be concentrated by freeing them from excess alkali metal cyanide and the products merchandised in such concentrated form.

In order to explain more fully the practice of my invention the following illustrative examples are given:

*Example 1.*—Five parts by weight of propionaldehyde were mixed with three parts by weight of sodium cyanide and ten parts by weight of water. The mixture was maintained at a temperature of about 50° C. for two hours and then allowed to cool. There was an apparent change in the appearance of the mixture during the reaction period. The reaction product was a homogeneous, mobile liquid, light yellow in color. This reaction mixture constitutes a product of my invention.

*Example 2.*—Diethyl ketone was treated according to the method of Example 1, and the product permitted to stand a few days. The reaction mixture separated into two layers, a colorless lower layer, which is probably sodium cyanide solution, and an upper layer which is light yellow in color. While I may use both layers mixed together as an addition agent, I prefer to separate, and use, the upper layer.

*Example 3.*—Methyl ethyl ketone was treated according to the process of Example 1 and then allowed to stand a few days. The reaction mixture separated into a lower, light yellow layer, and a small upper layer, dark red in color. Again I may use the mixture, but I prefer to use the upper layer.

*Example 4.*—Diacetyl was treated as in Example 1 and a homogeneous liquid was obtained.

*Example 5.*—Methyl n-propyl ketone was treated as in Example 3. A colorless upper layer and a colorless lower layer were obtained. Again I may use the reaction mixture, but I prefer to use the upper layer.

*Example 6.*—Acetone was treated according to the process of Example 3. After standing three weeks, a light red lower layer and a dark red upper layer formed. I may use the mixture as an addition agent but I prefer to merchandise the upper layer separately.

*Example 7.*—Butyraldehyde was treated according to the process of Example 3. The two layers which formed are both active as addition agents, and I may use either or the mixture. As will appear hereinafter the upper layer is the more effective.

*Example 8.*—Hexadecoic aldehyde was treated according to the process of Example 1, the mixture of aldehyde and cyanide being maintained at about 50° C. for four hours. The reaction mixture was allowed to stand over-night and was found to have separated with a top layer of nearly black cyanide reaction product. It is noted that the original aldehyde was light yellow in color.

The cyanide is preferably used in an amount at least equivalent to the aldehyde or ketone. I prefer to heat the mixture to between about 45° and 50° C. but good results are obtained between about 30 and 70° C. The products are preferably concentrated by neutralizing with sulfuric acid, but any other means may be employed. When acids are employed, the excess cyanide is removed as HCN gas and sodium sulfate.

As examples of aldehydes and ketones which I have found effective as addition agents I list the following. The lists include the agents of the above examples, for purposes of comparison. The agents are listed in the approximate order of their desirability for addition to plating baths, ketones and aldehydes being listed separately:

Aldehydes

1. Aldol
2. Acetaldehyde
3. Croton aldehyde
4. Paraldol
5. Propionaldehyde
6. α ethyl β propyl acrolein
7. Butyraldehyde
8. Acrolein
9. Citral
10. Citronellal
11. Hexadecoic aldehyde
12. Isobutylaldehyde

Ketones

1. Diethyl ketone
2. Methyl n-propyl ketone
3. Methyl ethyl ketone
4. Diacetyl
5. Light acetone oil
6. Heavy acetone oil
7. Isobutyl ketone
8. Acetone
9. Iso amyl ketone In my co-pending application Serial No. 737,610, filed July 30, 1934, I disclose the cyaldacets broadly, including the aldacets; aldol, acetaldehyde, croton aldehyde, and paraldol mentioned above. In said application the preparation and properties of the reaction products of the above aldacets with cyanide are discussed at some length, as is the use of the cyaldacets in plating, and it does not seem necessary to repeat such teachings here.

I wish to cover in this application aliphatic compounds of at least two carbon atoms which contain a carbonyl group, and their cyanide reaction products. I limit myself to compounds of at least two carbon atoms, as formaldehyde, with only one carbon atom, does not operate, though it does contain a C=O group. With the single exception of formaldehyde it appears that it is the presence of a C=O group which determines the applicability of aliphatic compounds to my purposes.

As the compounds contain more and more carbon atoms they appear to become less desirable. Citral and citronellal, for example, with nine carbon atoms are quite satisfactory as addition agents, but they tend to emulsify. Above about nine carbon atoms, the compounds become somewhat less desirable, hexadecoic aldehyde, for instance, with sixteen carbon atoms proved none too satisfactory as an addition agent even when the preformed cyanide reaction product was used. I prefer, accordingly, to use aliphatic compounds between two and nine carbon atoms which contain a carbonyl group. This terminology includes acetaldehyde, for example, as a two carbon compound and citral as a nine carbon compound. I especially prefer to use aliphatic compounds of two to nine carbon atoms which contain a carbonyl group and which contain no more than two hydroxyl groups. These expressions, of course, include compounds with more than one carbonyl group.

I have found that the presence of the carboxyl group is not particularly desirable. The element sulfur is preferably absent from compounds which I use as addition agents as my empirical results tend to show that some sulfur containing compounds which fall within my broad definitions are likely to cause a staining or discoloration of the work. I also prefer to employ as addition agents, or as materials to react with cyanide to form addition agents, compounds conforming to the above definitions which do not contain nitrogen. I especially prefer to use materials conforming to the above definitions which contain only carbon, hydrogen and oxygen.

The above may be expressed in some of its specific aspects, by the following:

$$C_nH_xO_{n-(1+y)}$$

Wherein $n$ equals two or more, tho preferably no more than nine; wherein $x$ is two or more; wherein $y$ is a positive, whole number except in the special case $n=2$ when $y=0$; wherein $n-(1+y)$ is one or more, but is less than $x/2$; and wherein at least one oxygen is joined to carbon by a double bond.

While my addition agents are effective in any customary cyanide bath, I prefer to use baths of the kind set forth in U. S. Patent 1,681,509, to Mr. Leon R. Westbrook. These baths are of the cyanide type, and contain a small amount of a compound of a metal of the iron group having an atomic weight greater than fifty-eight. The details as to the formulation and use of these baths may be found in the said Patent 1,681,509, and need not be duplicated here.

The plating baths of the said Patent 1,681,509 are modified only by employing my novel addition agents in lieu of the addition agents, goulac, dextrine, starch, etc. mentioned therein. While the plating processes described in the said Patent 1,681,509 lead to a bright, hard, dense, and smooth deposit of cadmium, and while the invention therein described and claimed has been widely accepted by the art because of its merit, the substitution of my addition agents for those of the patent results in a cadmium deposit of even greater smoothness, uniformity, and brightness.

Now considering the use of my addition agents in a typical bath of the type described in Patent No. 1,681,509, a bath was made up as follows:

Example 9

Grams per liter
Sodium cyanide (NaCN) _____ 130
Cadmium oxide (CdO) _____ 43
Sodium sulfate (Na₂SO₄) _____ 50
Cobalt sulfate (CoSO₄·7H₂O)  _____ 10
Addition agent.

To indicate the quantity of addition agent used when the agent was added to the bath directly, the following table is given for convenience. The agents are given in the approximate order of their desirability:

| Aldehyde addition agent | cc. per liter |
|---|---|
| Propionaldehyde | 17 |
| α-ethyl β-propyl acrolein | 20 |
| Butyraldehyde | 20 |
| Acrolein | 20 |
| Citral | 1 |
| Citronellal | 1 |
| Hexadecoic aldehyde | 1 |
| Iso butyl aldehyde | 20 |

| Ketone addition agent | cc. per liter |
|---|---|
| Diethyl ketone | 5 |
| Methyl n-propyl ketone | 7 |
| Methyl ethyl ketone | 15 |
| Diacetyl | 17 |
| Light acetone oil | 10 |
| Heavy acetone oil | 10 |
| Iso butyl ketone | 1 |
| Acetone | 10 |
| Iso amyl ketone | 2 |

The propionaldehyde and α-ethyl β-propyl acrolein produced perfect mirror-like deposits. The remaining aldehydes were quite satisfactory except iso butyl aldehyde, which produced a dense but somewhat lusterless deposit, and hexadecoic aldehyde, which was difficult to dissolve and which was none too satisfactory.

The diethyl ketone, methyl n-propyl ketone, methyl ethyl ketone, and diacetyl all led to very excellent results. The acetone oils led to quite satisfactory results, though this may be in part due to aldehydes in the oils. The acetone led to results which were none too satisfactory. The iso amyl ketone operated to some extent, but it is not nearly as good as the other ketones tried.

The bath of this example was also used with the addition agents pretreated as set forth in Examples 1 to 9, inclusive, with the following results when using in the bath the agent of:

*Example 1.*—1.5 cc. per liter. Brilliant mirror-like finish.

*Example 2.*—Colorless lower layer inactive. Yellow upper layer, 5 cc. per liter was used with excellent results.

*Example 3.*—Lower light yellow layer gave no appreciable effect. The dark red upper layer was used at 6 cc. per liter with fair results.

*Example 4.*—The diacetyl cyanide reaction product was used at 2 cc. per liter with good results.

*Example 5.*—The lower layer had no appreciable effect. The upper layer at 6 cc. per liter gave good results.

*Example 6.*—The lower layer was effective to a small degree. The upper layer gave fair results at 20 cc. per liter.

*Example 7.*—The lower layer gave good results at 15 cc. per liter. The upper layer gave somewhat better results at 5 cc. per liter.

*Example 8.*—The lower layer was inactive and the black upper layer was none too satisfactory, though at its optimum concentration of 5 cc. per liter the upper layer had a brightening action. Considerable difficulty was experienced in dissolving the upper layer in the bath.

It is interesting to note that the effectiveness of most of the compounds was increased by the pretreatment with cyanide. Acetone, particularly, is of little value when added directly to the bath, but is much better when pretreated. From a commercial standpoint I have found it desirable to pretreat.

I may use other compounds of metals of the iron group having an atomic weight greater than 58, such as nickel, copper, etc., as disclosed in the heretofore mentioned Patent 1,681,509, but my best results have been obtained using cobalt compounds according to the formula of Example 9.

I desire that it be clearly understood that the whole disclosure of the heretofore mentioned Patent 1,681,509, as well as that of U. S. 1,564,413, to Clayton M. Hoff, cited therein, is to be considered, in its entirety, as an integral part of my disclosure, as my novel addition agents coact with the cyanide-metal compound baths therein to produce a result unexpected from an examination of the attributes of either my addition agents or the baths of the said patent, for, while good results are obtained with my addition agents in any cyanide bath, the addition agents operate none too well in baths as concentrated as those of the Westbrook bath if the metal additions of the said patent are absent.

As an example of the use of my agents with other baths I give the following:

*Example 10*

| | Grams per liter |
|---|---|
| Cadmium oxide | 26 |
| Sodium cyanide | 87 |
| Addition agent. | |

The addition agents above described were used in amounts equal to about one-half of those used in Example 9. Excellent results were obtained.

The cadmium oxide may vary between about 15 and 40 grams per liter in a bath such as seen in Example 9 without a particularly great change in results. If more than 40 grams per liter is used, the bath is too concentrated and the results obtained are not entirely satisfactory. When using my addition agents with baths other than those of the Westbrook type care must be exercised lest the baths be too concentrated.

It is not necessary that pure compounds be used as addition agents for I may, of course, use commercial mixtures of aldehydes and/or ketones or, more particularly, their cyanide reaction products.

In order conveniently to merchandise my novel addition agents, I may incorporate them with the dry ingredients employed to make up a plating bath. The resulting dry mixture can be packaged and sold to the consumer who needs only to dissolve the mixture in water for use. Again, I may find it desirable to incorporate the addition agent with only one or a few of the ingredients and let the consumer add the other ingredients. Frequently, of course, it will be desirable to merchandise the novel addition agent as such.

In view of the fact that there is no term which designates the C=O group as it appears in aldehydes and ketones in contradistinction to the C=O group as it appears in acids, etc., I have used "carbonyl group" in this limited sense. Of course, the C=O group appears in acids,

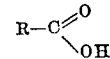

as well as in aldehydes and ketones, but I do not intend the term "carbonyl group" to include the C=O group of acids. Strictly, the "carbonyl group" as referred to herein might more accurately be designated a carbonyl group in which a third carbon valence is joined to carbon and in which the remaining valence is satisfied by carbon or by hydrogen. Or, in chemical symbols, the "carbonyl group" as referred to herein is of the type

wherein R is a hydrocarbon radical and wherein R' is hydrogen, in the case of an aldehyde, or R' is a hydrocarbon radical, in the case of a ketone. It is believed that the simple expression "a carbonyl group", as applied to one or more aldehydic or ketonic C=O groups, both simplifies and clarifies the specification and claims, but the expression must be understood, in every use, to designate C=O groups of the kind above considered.

I do not intend to be limited to the illustrative conditions and examples above given, the scope of my invention being set forth in the appended claims.

I claim:

1. A cyanide-cadmium plating composition containing a reaction product with an alkali metal cyanide of an aliphatic compound which has from two to nine carbon atoms, which has no more than two hydroxyl groups, which is free of sulfur, nitrogen, and the carboxyl group, and which contains a carbonyl group.

2. A cyanide-cadmium plating composition containing a reaction product with an alkali metal cyanide of an aliphatic compound, containing a carbonyl group, selected from the group consisting of propionaldehyde, αethyl βpropyl acrolein, butyraldehyde, acrolein, citral, citronellal, diethyl ketone, methyl n-propyl ketone, methyl ethyl ketone, diacetyl, acetone oil, iso butyl ketone, and acetone.

3. A cyanide-cadmium plating bath containing a small amount of a compound of a metal of the iron group having an atomic weight greater than fifty-eight, and a reaction product with an alkali metal cyanide of a carbonyl-group-containing aliphatic compound selected from the group consisting of propionaldehyde, αethyl βpropyl acrolein, butyraldehyde, acrolein, citral, citronellal, diethyl ketone, methyl ethyl ketone, diacetyl, acetone oil, iso butyl ketone, and acetone.

4. In a cadmium plating process the step comprising electrodepositing cadmium from a cyanide-cadmium bath in the presence of a reaction product with an alkali metal cyanide of an aliphatic compound, containing a carbonyl group, selected from the group consisting of propionaldehyde, αethyl βpropyl acrolein, butyraldehyde, acrolein, citral, citronellal, diethyl ketone, methyl n-propyl ketone, methyl ethyl ketone, diacetyl, acetone oil, iso butyl ketone, and acetone.

5. In a cadmium plating process the step comprising electrodepositing cadmium from a cyanide-cadmium bath in the presence of both a small amount of a compound of a metal of the iron group having an atomic weight greater than 58, and a reaction product with an alkali metal cyanide of an aliphatic compound, containing a carbonyl group, selected from the group consisting of propionaldehyde, αethyl βpropyl acrolein, butyraldehyde, acrolein, citral, citronellal, diethyl ketone, methyl n-propyl ketone, methyl ethyl ketone, diacetyl, acetone oil, isobutyl ketone, and acetone.

6. A cyanide-cadmium plating bath to which has been added a carbonyl group-containing aliphatic compound selected from the group consisting of propionaldehyde, αethyl βpropyl acrolein, butyraldehyde, acrolein, citral, citronellal, diethyl ketone, methyl n-propyl ketone, methyl ethyl ketone, diacetyl, acetone oil, iso butyl ketone, and acetone.

7. In a process for the electrodeposition of cadmium from a cyanide-cadmium bath, the step comprising depositing cadmium from such a bath to which has been added a carbonyl group-containing aliphatic compound selected from the group consisting of propionaldehyde, αethyl βpropyl acrolein, butyraldehyde, acrolein, citral, citronellal, diethyl ketone, methyl n-propyl ketone, methyl ethyl ketone, diacetyl, acetone oil, iso butyl ketone, and acetone.

8. A cyanide-cadmium plating composition containing an addition agent prepared by pre-reacting an aliphatic compound with an alkali metal cyanide, the aliphatic compound having no less than two and no more than about sixteen carbon atoms, having no more than two hydroxyl groups, and containing a carbonyl group.

9. A cyanide-cadmium plating composition containing an addition agent prepared by pre-reacting an aliphatic compound with an alkali metal cyanide, the aliphatic compound having from two to nine carbon atoms, having no more than two hydroxyl groups, and containing a carbonyl group.

10. In a cadmium plating process, the step comprising electrodepositing cadmium from a cyanide cadmium bath to which has been added an aliphatic compound having no less than two and no more than about sixteen carbon atoms, having no more than two hydroxyl groups, and containing a carbonyl group.

JOHN A. HENRICKS, JR.